US011110675B2

(12) United States Patent
Doppenberg et al.

(10) Patent No.: US 11,110,675 B2
(45) Date of Patent: Sep. 7, 2021

(54) TIRE BUILDING DRUM AND A METHOD FOR USING IT

(71) Applicant: VMI Holland B.V., Epe (NL)

(72) Inventors: Evert Doppenberg, Epe (NL); Gerrit Rodijk, Epe (NL); Martin De Graaf, Epe (NL)

(73) Assignee: VMI HOLLAND B.V.

( * ) Notice: Subject to any disclaimer, the term of this patent is extended or adjusted under 35 U.S.C. 154(b) by 456 days.

(21) Appl. No.: 15/745,668

(22) PCT Filed: Jul. 11, 2016

(86) PCT No.: PCT/NL2016/050512
§ 371 (c)(1),
(2) Date: Jan. 17, 2018

(87) PCT Pub. No.: WO2017/018875
PCT Pub. Date: Feb. 2, 2017

(65) Prior Publication Data
US 2018/0207894 A1   Jul. 26, 2018

Related U.S. Application Data

(60) Provisional application No. 62/198,905, filed on Jul. 30, 2015.

(30) Foreign Application Priority Data

Jul. 30, 2015  (NL) .................................... 2015246

(51) Int. Cl.
B29D 30/32       (2006.01)
(52) U.S. Cl.
CPC ........ B29D 30/32 (2013.01); *B29D 2030/325* (2013.01); *B29D 2030/3214* (2013.01)

(58) Field of Classification Search
CPC ............ B29D 30/32; B29D 2030/3264; B29D 2030/3242; B29D 2030/325; B29D 2030/3257; B29D 2030/3221
(Continued)

(56) References Cited

U.S. PATENT DOCUMENTS 2,084,009 A * 6/1937 Sohl ..................... B29D 30/248
156/416
2,986,196 A * 5/1961 Frazier ................. B29D 30/245
156/415
(Continued)

FOREIGN PATENT DOCUMENTS

DE          1268372       5/1968
DE        102011056337    6/2013 ............ B29D 30/32
(Continued)

OTHER PUBLICATIONS

Chinese Office Action (w/machine translation) issued in application No. 20168044390.X, dated Jul. 23, 2019 (10 pgs).
(Continued)

*Primary Examiner* — Katelyn W Smith
*Assistant Examiner* — Alexander D Booth
(74) *Attorney, Agent, or Firm* — Hayes Soloway P.C.

(57) ABSTRACT

Provided is a tire building drum and a method for shaping tire components on the tire building drum, wherein the tire building drum has an annular sleeve that extends over turn-up arms in the longitudinal direction of the turn-up arms. The sleeve is elastic in the circumferential direction and fits elastically around the turn-up arms. The sleeve is provided with inelastic reinforcement elements extending in at least a part of the sleeve in a reinforcement direction transverse to the circumferential direction of the tire building drum, and has a fixed end that is retained in the axial
(Continued)

direction and a movable end that is movable over the turn-up arms in their respective longitudinal directions.

28 Claims, 7 Drawing Sheets

(58) Field of Classification Search
USPC .......................................... 156/402, 132, 415
See application file for complete search history.

(56) References Cited

U.S. PATENT DOCUMENTS

| | | | | |
|---|---|---|---|---|
| 3,078,204 | A | 2/1963 | Appleby | 156/132 |
| 3,111,443 | A * | 11/1963 | Giletta | B21C 37/02 |
| | | | | 156/401 |
| 3,887,423 | A | 6/1975 | Gazuit | 156/402 |
| 4,381,331 | A * | 4/1983 | Johnson | B29C 37/0075 |
| | | | | 156/154 |
| 5,250,142 | A | 10/1993 | Weimer et al. | 156/401 |
| 5,660,677 | A * | 8/1997 | Remond | B29D 30/32 |
| | | | | 156/400 |
| 5,728,311 | A * | 3/1998 | Patitsas | B29C 33/505 |
| | | | | 249/65 |
| 6,585,022 | B1 | 7/2003 | Rex | 156/401 |
| 6,880,603 | B2 | 4/2005 | Akiyama | 156/402 |
| 2009/0139660 | A1* | 6/2009 | Baldoni | B29D 30/32 |
| | | | | 156/414 |
| 2010/0175813 | A1* | 7/2010 | Marangoni | B29D 30/32 |
| | | | | 156/123 |
| 2013/0209596 | A1* | 8/2013 | Phelps | C08L 23/22 |
| | | | | 425/52 |

FOREIGN PATENT DOCUMENTS

| | | | |
|---|---|---|---|
| DE | 102011056338 | 6/2013 | ............. B29D 30/32 |
| EP | 0862987 A2 * | 9/1998 | ........... B29C 53/025 |
| FR | 1485919 | 6/1966 | |
| FR | 1502282 | 11/1966 | |
| GB | 1268665 A * | 3/1972 | ............. B29D 30/32 |
| JP | 2003080612 | 3/2003 | ............. B29D 30/24 |
| JP | 2008221718 | 9/2008 | ............. B29D 30/24 |
| JP | 2008307849 | 12/2008 | ............. B29D 30/24 |
| JP | 2017529257 | 10/2017 | ............. B29D 30/32 |
| RU | 2223861 | 2/2004 | ............. B29D 30/24 |
| RU | 2429128 | 11/2011 | ............. B29D 30/24 |
| SU | 750902 | 1/1991 | ............. B29D 30/32 |
| TW | 184215 | 6/1991 | |
| WO | WO0108874 | 2/2001 | ............. B29D 30/24 |
| WO | WO2017018875 | 2/2017 | ............. B29D 30/32 |

OTHER PUBLICATIONS

International Preliminary Report on Patentability issued in application No. PCT/NL2016/050512, dated Jan. 30, 2018 (7 pgs).
International Search Report and Written Opinion issued in application No. PCT/NL2016/050512, dated Nov. 10, 2016 (12 pgs).
Japanese Decision to Grant (w/translation) issued in application No. 2017-502796, dated Apr. 25, 2018 (4 pgs).
Russian Search Report (w/translation) issued in application No. 2017117276, dated Apr. 11, 2018 (4 pgs).
Taiwanese Search Report (no translation) issued in application 105123515, dated Feb. 3, 2017 (1 pg).

* cited by examiner

TIRE BUILDING DRUM AND A METHOD FOR USING IT

BACKGROUND

The invention relates to a tire building drum and a method for shaping tire components on said tire building drum.

DE 1 268 372 B discloses a tire building apparatus with an expandable building drum. The building drum is provided with a so-called rolling bladder that is pressurized to fold the lateral edges of a carcass around respective bead cores. The building drum furthermore has a plurality of sliding bodies which are arranged on the inside of the rolling bladder to support the folding process. The ends of the rolling bladder are fixedly attached to the tire building drum to form an enclosed space which is pressurized to an overpressure. The rolling bladder is designed to expand uniformly with the diameter expansion of the sliding bodies to prevent undesired deformations of the tire components supported thereon. The rolling bladder is further provided with parallel reinforcement inserts extending in the direction of the main shaft so that the diameter of the rolling bladder can be expanded considerably, while elongation of the rolling bladder in the axial direction is excluded.

The known rolling bladder is provided with a surplus length in the axial direction to accommodate the length of the rolling bladder that is taken up by the diameter expansion of the sliding bodies. A disadvantage of surplus length of the bladder is, that the motion of the surplus length of the bladder during expansion and the subsequent contraction of the sliding bodies is uncontrolled and therefore makes the rolling motion of the bladder less accurate. The uncontrolled motion of the surplus length further poses the risk of the rolling bladder becoming stuck in or entangled with other components of the tire building apparatus. Furthermore, the surplus length of the rolling bladder consumes space in the tire building apparatus which can not be used for other components.

DE 10 2011 056 338 A1 discloses a tire building drum with turn-up arms and a sleeve that is slidable over the arms in a longitudinal direction of said arms. One end of the sleeve is mounted to a bead clamp while the opposite end is connected to the arms via a spring. According to the description of DE 10 2011 056 338 A1, the sleeve is multidirectionally deformable such that the carcass members supported on said sleeve can be deformed evenly. DE 10 2011 056 337 A1 discloses a similar tire building drum that employs the same multidirectionally deformable sleeve. However, carcass members typically do not stretch at the same rate in all directions like the sleeve. Hence, in practice, instead of the carcass members stretching evenly as intended, the known sleeves unavoidably cause friction between the sleeve and the carcass members. As the friction builds, the carcass member may shift unpredictably and/or abruptly over the sleeve, which can cause undesirable and uneven deformations in said carcass members.

It is an object of the present invention to provide a tire building drum and a method for shaping tire components on said tire building drum, wherein the operation can be improved.

SUMMARY OF THE INVENTION

According to a first aspect, the invention provides a tire building drum comprising a rotational axis that defines an axial direction of the tire building drum, wherein the tire building drum further comprises a bead holder extending in a circumferential direction around the rotational axis at a first axial position for holding a bead at said first axial position and an axially movable arm drive member extending circumferentially around the rotational axis at a second axial position spaced apart from the first axial position, wherein the tire building drum is provided with turn-up arms which are distributed circumferentially about the rotational axis and which together form a circumferential surface for supporting tire components between the first axial position and the second axial position, wherein each one of the turn-up arms extends in a longitudinal direction from the arm drive member towards the bead holder and is hingably coupled to the arm drive member about a respective turn-up axis for turning up the tire components supported thereon around the bead at the bead holder as the arm drive member moves towards the bead holder, wherein the tire building drum comprises an annular sleeve that extends over the turn-up arms in their respective longitudinal directions, wherein the sleeve is elastic in the circumferential direction and fits elastically around the turn-up arms, wherein the sleeve is provided with inelastic reinforcement elements extending in a reinforcement direction parallel to the longitudinal direction of the turn-up arms at least in the part where the sleeve is supported on the turn-up arms, wherein the sleeve is provided with a fixed end that is retained in the axial direction at or near the first axial position and a movable end that is movable over the turn-up arms in their respective longitudinal directions.

The sleeve can thus be expanded and contracted together with the movement of the turn-up arms in the radial direction, without requiring a surplus of length to compensate for the expansion of the turn-up arms. The reinforcement elements can prevent elongation of the sleeve in said longitudinal direction, thereby reducing friction between the sleeve and the tire components during turning-up. Hence, unpredictable and/or abrupt shifting of the tire components on the sleeve and/or undesirable deformations in the tire components during the turning-up. Despite the inelasticity of the sleeve in said longitudinal direction the free end of the sleeve can simply move over the turn-up arms in response to the expansion of the turn-up arms while the length of the sleeve in the longitudinal direction of the arms remains substantially constant. The resulting tire building drum can be more compact. Also, the sleeve can be operated more accurately as its movable end moves over and is supported on the turn-up arms. The sleeve can be elastically fitted in a tight manner around the turn-up arms, thereby preventing that the sleeve gets stuck into or gets entangled with other components of the tire building drum.

It is noted that in the tire building drum of the present invention the turning-up of the sidewalls is actuated by the turn-up arms. The sleeve assists this turning-up action of the turn-up arms. This in contrast to folding mechanism according to DE 1 268 372 B, where a pressurized rolling bladder is used for the folding and wherein the sliding bodies assist the folding process of the pressurized bladder.

In a preferred embodiment the movable end of the sleeve is slidably movable in the respective longitudinal directions of the turn-up arms over the turn-up arms. By simply sliding the free end of the sleeve over the turn-up arms, no special mechanism is required to guide the free end, thereby simplifying the design of the tire building drum.

In an embodiment, the movable end of the sleeve is a free end, and is arranged to freely and/or passively move in the longitudinal direction over the turn-up arms in response to contraction and/or expansion of the turn-up arms. According to this embodiment, the free end is arranged to move freely, thus without obstruction, and/or to move passively, thus without an supplementary driving means in particular not being part of the sleeve. The sleeve can thus function without an active drive for moving said free end.

In an embodiment the tire building drum is provided with a biasing element for biasing the free end of the sleeve to move in the respective longitudinal directions of the turn-up arms over the turn-up arms towards the second axial position. Preferably, the biasing element is an elastic annular biasing element that is arranged to be elastically fitted in the circumferential direction around the sleeve at or near the free end. Most preferably, the elastic annular biasing element is an annular spring. The biasing element can aid the return of the free end towards the second axial position, so that the free end returns automatically after the turning-up of the turn-up arms.

In an alternative embodiment, the movable end of the sleeve is slidably movable in the respective longitudinal directions of the turn-up arms over the turn-up arms, and wherein the tire building drum is provided with biasing elements for biasing the movable end of the sleeve to move in the respective longitudinal directions of the turn-up arms over the turn-up arms towards the second axial position. Preferably, the biasing elements comprises elastic biasing elements, each of which is on a first side attached to the movable end, and on a second side facing away from the first side, attached to a turn-up arm at or near and end thereof which faces away from the bead holder. Preferably, the biasing elements comprises a spring. The biasing elements drive the return of the movable end towards the second axial position, so that the movable end is pulled back towards the second position when the turn-up arms contract toward the drum after the turning-up of the turn-up arms.

In an embodiment the sleeve comprises an elastomeric material, preferably rubber. The elastomeric material in the sleeve allows for the elastic expansion of the sleeve in at least the circumferential direction of the tire building drum.

In an embodiment the sleeve comprises a rubber layer having an internal surface that faces radially inwards and an external surface that faces radially outwards, wherein the sleeve comprises one or more coatings or surface layers that are applied to the internal surface, the external surface or both. The coatings or surface layers can be different from the material of the rubber and can provide the internal surface and/or the external surface with different characteristics.

In an embodiment the reinforcement elements are embedded in the rubber layer. The reinforcement elements thus prevent elongation of the reinforced rubber layer in the reinforcement direction.

In an alternative embodiment the reinforcement elements are embedded in or formed by the one or more coatings or surface layers. The rubber layer itself can thus be elastic in the reinforcement direction, while the coatings can restrict the elongation of the in the reinforcement direction.

In an embodiment the one or more coatings or surface layers comprises a low-friction material on the internal surface of the rubber layer. Alternatively or additionally, the one or more coatings or surface layers comprises a low-friction material on the external surface of the rubber layer. The low friction material on the internal surface of the rubber layer improves the sliding of the sleeve over the turn-up arms. The low friction material on the external surface of the rubber layer improves the release properties of the sleeve with respect to the turned-up tire components.

In a preferred embodiment each of the turn-up arms is provided with a sliding surface that faces radially outwards and that abuts the sleeve, wherein the sliding surface is coated with a low-friction material. The coating on the sliding surface, in particular when combined with a coating or surface layer on the internal surface of the rubber layer of the sleeve, facilitates easy sliding of the sleeve over the sliding surfaces.

In a specific embodiment the low-friction material comprises a plasma coating, Teflon layer or a combination thereof. These materials are particularly suitable for reducing friction between the turn-up arms, the sleeve and/or the tire components.

In an alternative embodiment, each of the turn-up arms is provided with a plurality of rollers distributed along the longitudinal direction of said arm and arranged for contacting and facilitating the movement of said sleeve over the turn-up arms.

In an embodiment the reinforcement elements extend in planes intersecting with and parallel to or substantially parallel to the axial direction. The reinforcement elements can thus prevent elongation of the sleeve in said planes.

In an embodiment the reinforcement elements extend in the path of the sleeve between the fixed end and the movable end, preferably at least in the part of the sleeve that is arranged to receive the tire components. Elongation of the sleeve in said part of the sleeve can thus be prevented, thereby reducing undesirable deformations in the tire components during the turning-up.

In an embodiment the reinforcement elements extend in the full length of the sleeve between the fixed end and the movable end. Thus, elongation of the sleeve in the reinforcement direction can be prevented throughout the length of the sleeve.

In an embodiment the reinforcement direction has at least a directional component parallel to the axial direction. Consequently, an elongation component of the sleeve in the axial direction can be prevented.

In a specific embodiment the reinforcement elements are reinforcement cords, preferably composite fiber reinforcement cords comprising Polyethylene terephthalate (PET), Aramid and/or Rayon fibers. Reinforcement cords can suitable reinforce the sleeve in the reinforcement direction while still allowing for a circumferential expansion of the sleeve.

In an embodiment each turn-up arm comprises a proximal end that is hingably coupled to the arm drive member, a distal end that faces the bead holder and an elongate arm body extending between the proximal end and the distal end, wherein the arm body is provided with a sliding surface that faces radially outwards and that abuts the sleeve, wherein the sliding surface comprises a conical part that extends under a more oblique angle with respect to the axial direction than the rest of the sliding surface. Preferably, the conical part of the sliding surface is nearest to the proximal end with respect to the rest of the sliding surface. The conical part can aid the movable end, in particular the free end of the sleeve, to more easily slide back towards the second axial position, even when the turn-up arms are almost in the level orientation.

In an embodiment the sleeve extends in the axial direction to the opposite side of the bead holder with respect to the arm drive member, wherein the tire building drum is provided with a fixing member that is coupled to the fixed end of the sleeve to retain said fixed end in the axial direction.

In an embodiment the bead holder comprises a bead lock mechanism that is expandable in the radial direction for clamping the bead in a radially outward direction, wherein the part of the sleeve near the fixed end extends in the axial direction over the bead lock mechanism and, in use, is arranged to be retained in the axial direction between the bead and said bead lock mechanism. The sleeve can thus be additionally or alternatively retained between the bead locking mechanism and the bead. Preferably, the fixed end is be fixed to the drum, in particular independently of the bead holder and at a position between the bead holder and a center of the drum. Accordingly, the sleeve extends over the bead holder, and in use is arranged between the bead holder and a bead. During the turn-up action, the sleeve thus extends around at least the lower part of the bead and upwards along the side-wall. This can provide a better retaining of the bead at least during the turn-up action, a better support of the bead and/or a more tight and/or taut enclosure of the bead by the inner liner, one or more body plies and/or the side wall, which can prevent the occurrence of air enclosures.

In an embodiment the turn-up arms are hingable with respect to their respective hinge axes between a level orientation in which the turn-up arms extend parallel to or substantially parallel to the axial direction and a turned-up orientation in which the turn-up arms extend under an oblique angle with respect to the axial direction from the first radius at the arm drive member towards a second, larger radius radially outside the bead holder, wherein the reinforcement elements extend parallel to or substantially parallel to the axial direction in the level orientation of the arms. The sleeve can thus be kept substantially flat and/or smooth, thereby allowing for tire components to be applied around the tire building drum by strip winding, winding or other application techniques.

In a preferred embodiment thereof, the reinforcement elements extend mutually parallel in the level orientation of the arms. The parallelism of the reinforcement cords can increase the uniformity of the expansion of the material of the sleeve between the reinforcement cords.

According to a second aspect, the invention provides a method for shaping tire components on the aforementioned tire building drum, wherein the method comprises the steps of:
  applying a carcass around the tire building drum, wherein a lateral part of the carcass extends over the bead holder in the axial direction and around the sleeve from the first axial position towards the second axial position;
  applying a bead around the carcass at the bead holder;
  moving the arm drive member in the axial direction towards the bead holder to cause the turn-up arms to turn-up the lateral part of the carcass supported thereon around the bead at the bead holder; and
  retaining the fixed end in the axial direction at or near the first axial position while allowing the movable end to move in the respective longitudinal directions of the turn-up arms over the turn-up arms towards the first axial position.

In an embodiment the method further comprises the steps of:
  moving the arm drive member in the axial direction away from the bead holder to cause the turn-up arms to return to a level orientation; and
  retaining the fixed end in the axial direction at or near the first axial position while allowing the movable end to move in the respective longitudinal directions of the turn-up arms over the turn-up arms towards the second axial position.

The method and its embodiments have the same advantages as the corresponding embodiments of the aforementioned tire building drum according to the first aspect of the present invention. The advantages will not be repeated hereafter for reasons of conciseness.

In an embodiment of said method, the sleeve is biased to move towards the second axial position, wherein step of allowing the movable end to move along the respective longitudinal directions of the turn-up arms over the turn-up arms towards the second axial position, occurs automatically with the returning of the turn-up arms to their level orientation.

In a further embodiment of said method, the bias is generated by the elasticity of the sleeve in the circumferential direction.

In an embodiment, the method comprises the step of providing a biasing element for exerting a biasing force on the sleeve to cause the sleeve to move in the respective longitudinal directions of the turn-up arms over the turn-up arms towards the second axial position.

In an embodiment of the method, the movement of the sleeve over the turn-up arms in the respective longitudinal directions of the turn-up arms is a sliding movement.

In an embodiment of the method, the movement of the sleeve in the respective longitudinal directions of the turn-up arms over the turn-up arms is a free and/or passive movement over the turn-arms in response to contraction and/or expansion of the turn-up arms.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which.

DETAILED DESCRIPTION OF THE INVENTION

Figure 1:
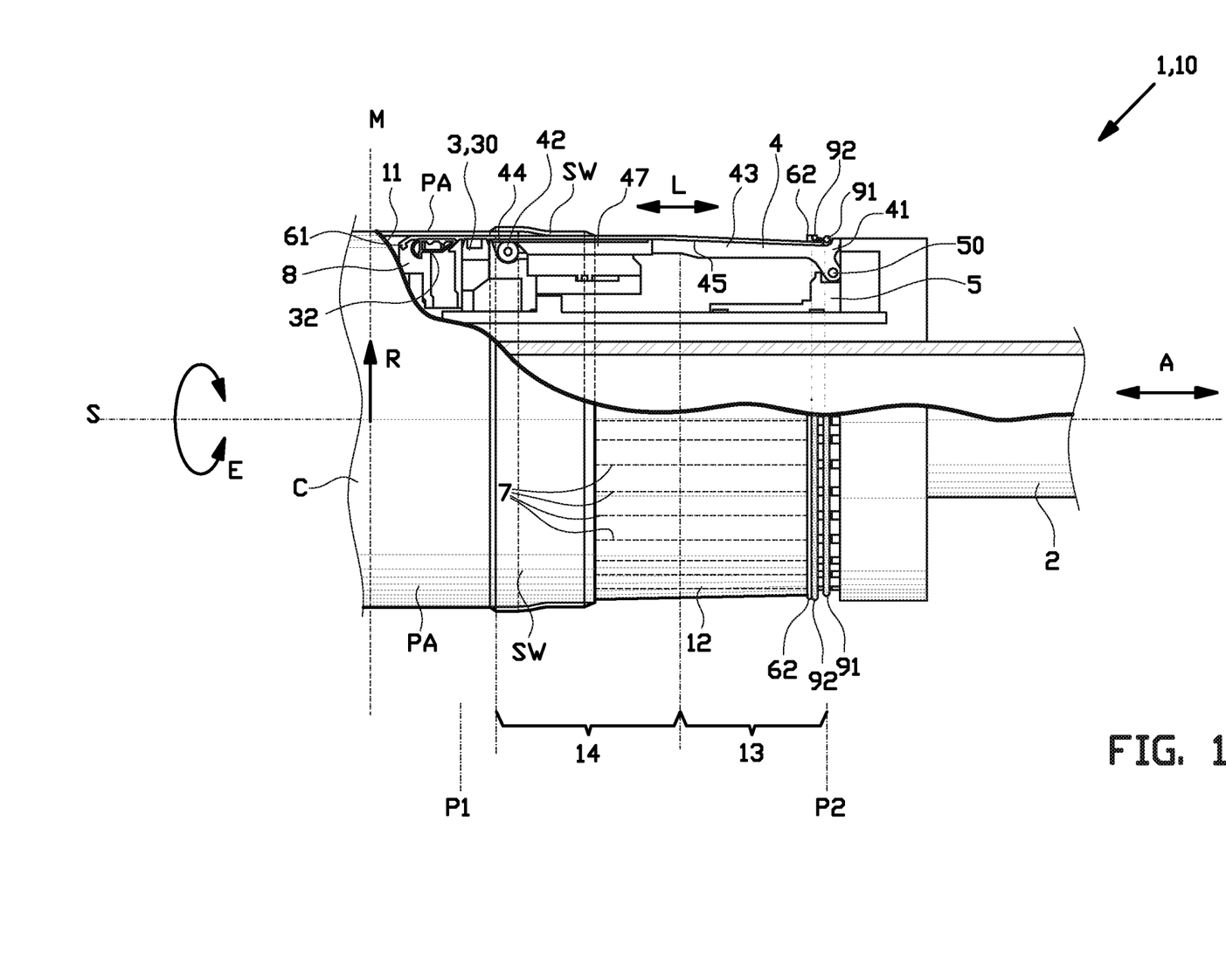
FIG. 1 shows a side view of a first example of a tire building drum according to the present invention with a plurality of turn-up arms, a sleeve and a carcass arranged around the sleeve, wherein the turn-up arms are in a level orientation prior to turning-up of the turn-up arms.

FIG. 1 shows a first example of a tire building drum 1, in particular a tire shaping drum, for shaping a carcass C of a green or unvulcanised tire. The tire building drum comprises two of said drum halves 10, which are mirror-symmetrical with respect to each other about a center deck 11 at a mid-plane M of the tire building drum 1. Only one of the drum halves 10 of the tire building drum 1 and a part of the center deck 11 are shown. Only one of the drum halves 10 will be described hereafter.

The carcass C typically comprises a pre-assembly PA of an inner-liner and a side wall SW. Typically, one sidewall SW is applied on each of the drum halves 10 near the lateral side of the carcass C at said respective drum half 10. Typically, one or more body plies of substantially the same dimensions as the inner-liner are arranged on top of the inner-liner PA. Beads B are provided onto the carcass C at both sides of the center deck 11 to seal of a part of the carcass C at the center deck 11. Said part of the carcass C is subsequently shaped by the center deck 11, e.g. by inflation, in a manner known per se. The carcass C, together with the sidewalls SW are turned-up by the two drum halves 11 around the respective beads B against the already shaped part of the carcass C at the center deck 11 to reinforce the radial sides of the green tire.

Figure 3:
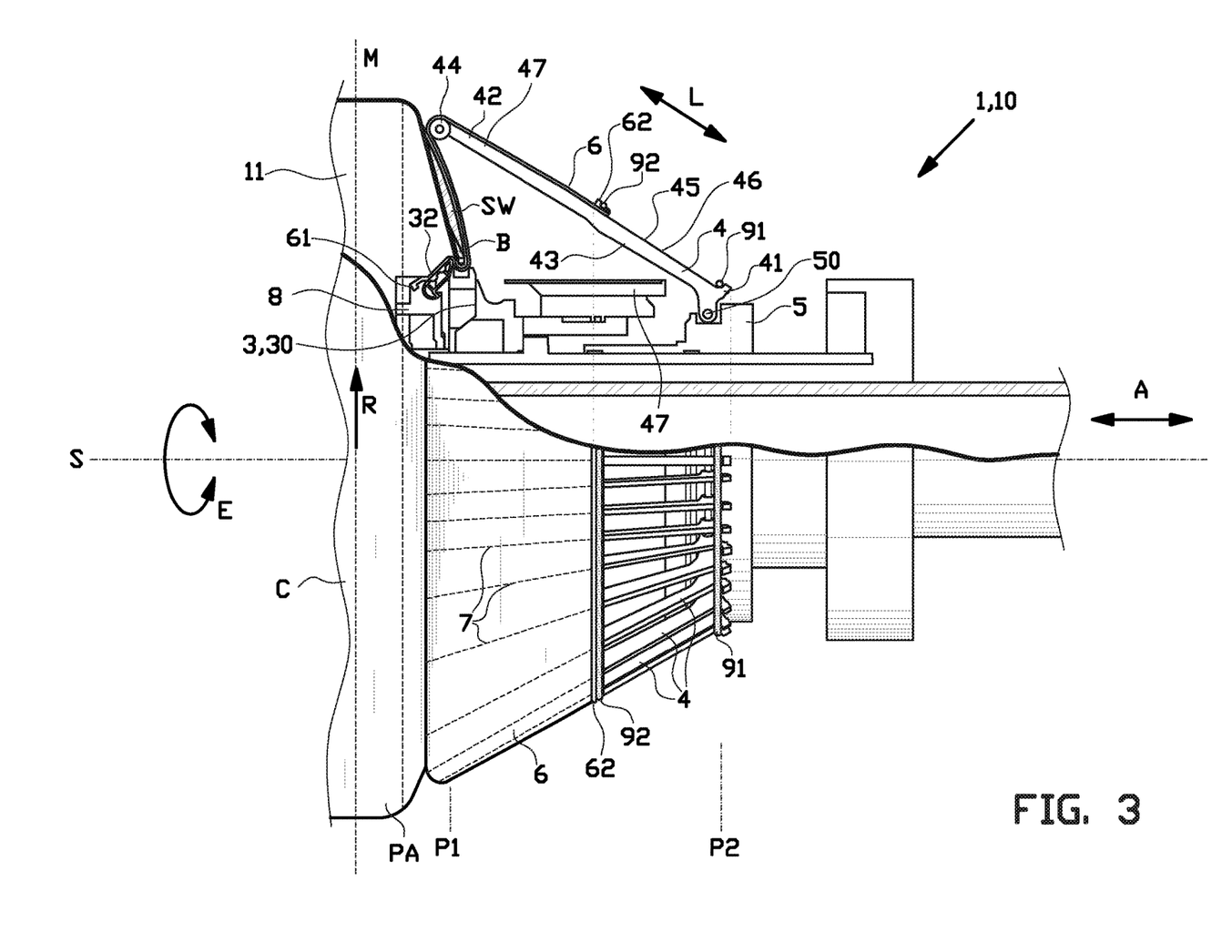
FIG. 3 shows a side view of the tire building drum according to FIG. 2, after the turn-up arms have been turned up into a turned-up orientation.
Figure 4:
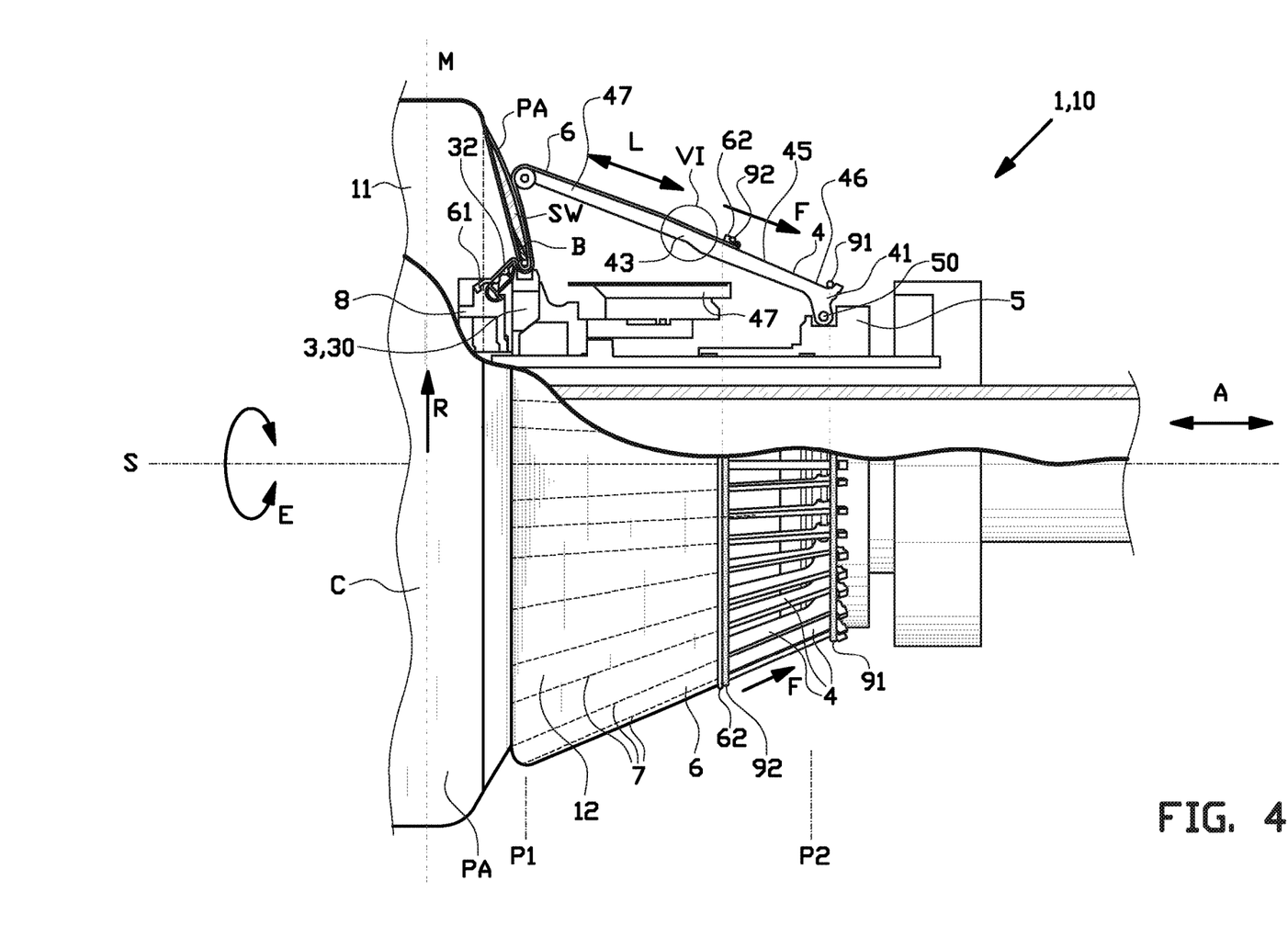
FIG. 4 shows a side view of the tire building drum according to FIG. 3, during the return of the turn-up arms from the turned-up orientation towards the level orientation.
Figure 5:
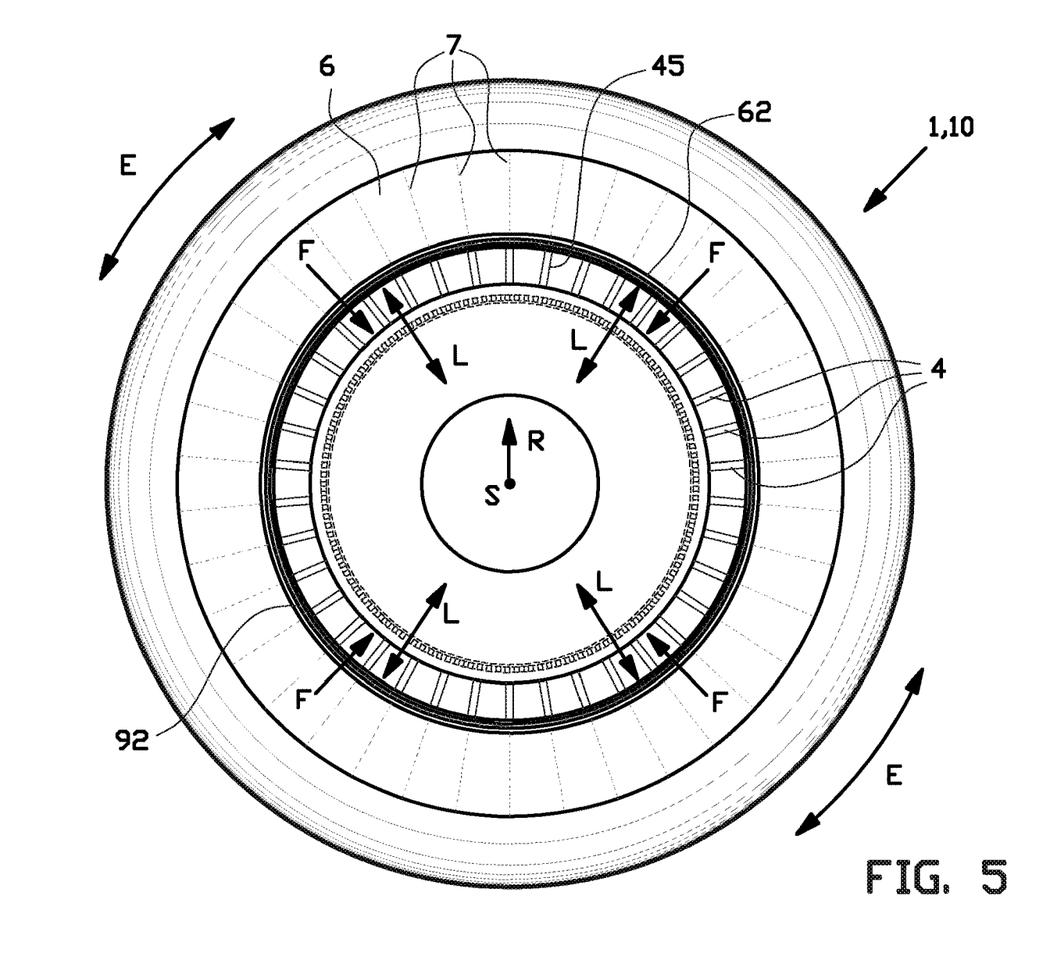
FIG. 5 shows a front view of the tire building drum according to FIG. 4.

As shown in FIGS. 1-4, the tire building drum 1 comprises a drum shaft 2 that defines an axial direction A and a rotational axis S of the tire building drum 1. The drum halves 10 of the tire building drum 1 are rotatably supported on the drum shaft 2 about said rotational axis S. FIGS. 1-4 also schematically show the radial direction R of the tire building drum 1, perpendicular to the axial direction A. FIG. 5 shows the circumferential direction E of the tire building drum 1.

The tire building drum 1 further comprises a bead holder 3 for holding the bead B around the carcass C and a plurality of turn-up arms 4 for turning-up the carcass C in the radial direction R around the bead B against the shaped part of the carcass C at the center deck 11. The plurality of arms 4 are distributed circumferentially around the drum shaft 2, as best seen in FIG. 5, to form a circumferential surface 12 of the tire building drum 1 that in use supports the carcass C. The tire building drum 1 is further provided with an arm drive member 5 for driving the turning up of the turn-up arms 4. Each of the turn-up arms 4 is hingably coupled to the arm drive member 5 about a turn-up axis that extends tangential to the circumferential direction E, tangential meaning perpendicular to the radial direction R at the respective turn-up arm 4 and perpendicular to the axial direction A. The turn-up arms 4 are hingable between a level orientation, as shown in FIG. 1, and a turned-up orientation, as shown in FIG. 3.

Figure 2:
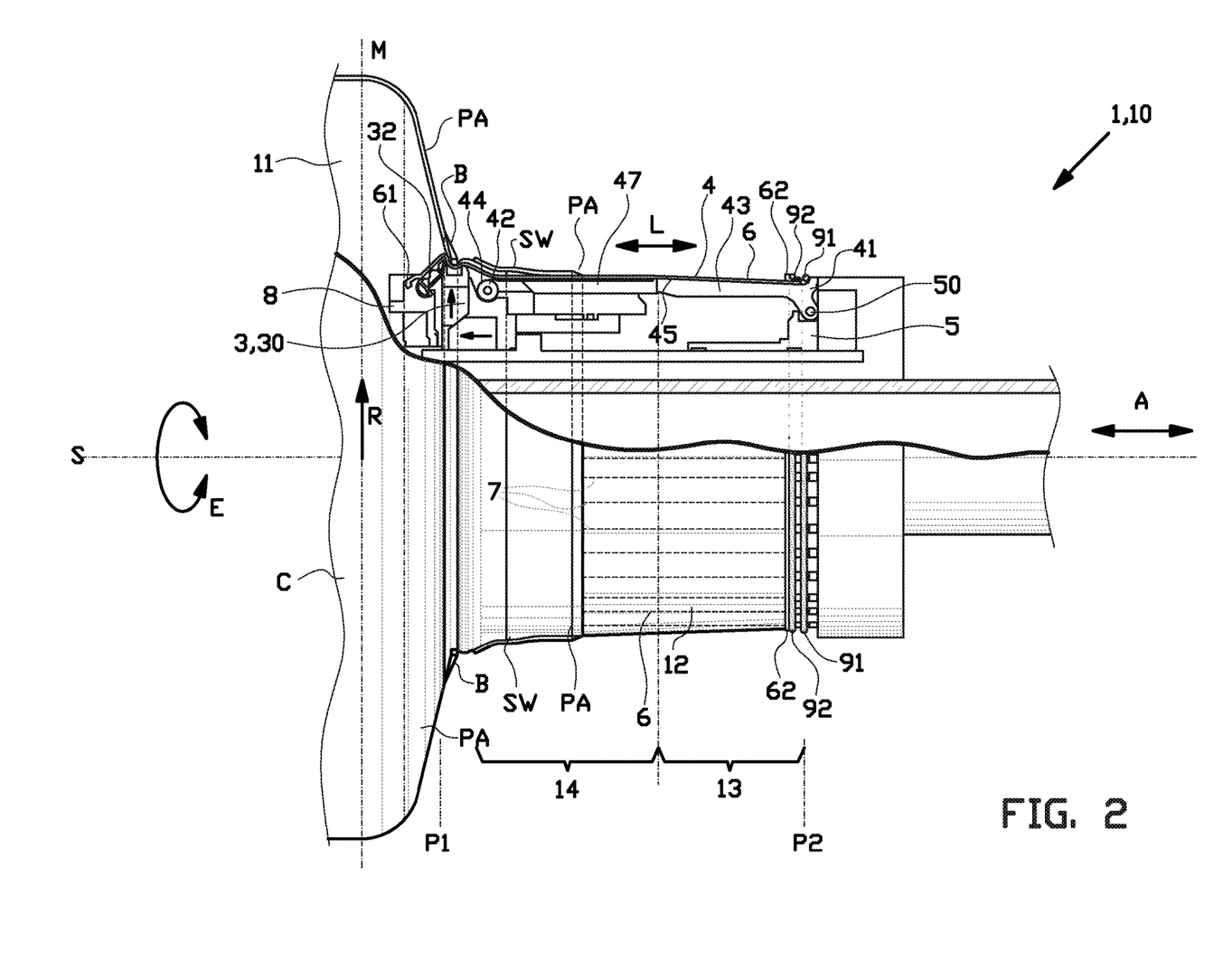
FIG. 2 shows a side view of the tire building drum according to FIG. 1, with a bead applied around the carcass.

The bead holder 3, as shown in FIG. 1, extends circumferentially or annularly around the drum shaft 2 at a first axial position P1 along the axial direction A. The arm drive member 5 also extends annularly or circumferentially around the drum shaft 2 and is movable over the drum shaft 2 in the axial direction A towards and away from the bead holder 3. The arm drive member 5 is therefore in a variable second axial position P2 with respect to and spaced apart from the first axial position P1. The relative axial movement of the arm drive member 5 with respect to the bead holder 3 causes the turn-up arms 4 to turn up the pre-assembly PA around the bead B and the side wall SW thereof, against the shaped part of the carcass C, as shown in FIGS. 1-3. The arm drive member 5 is driven by a suitable drive, e.g. a spindle drive arranged inside the drum shaft 2 (not shown).

The bead holder 3 comprises a bead lock mechanism 30, known per se, that is expandable and contractible in the radial direction R of the tire building drum 1 to lock or clamp the bead B supported thereon against the carcass C, as shown in FIG. 2.

As best seen in FIG. 3, each turn-up arm 4 comprises a proximal end 41 that is hingably coupled to the arm drive member 5 via a hinge 50, so as to be rotatable around a respective turn-up axis. Each turn-up arm 4 further comprises a distal end 42 that faces the bead holder 3 and an elongate arm body 43 extending in a longitudinal direction L of the turn-up arm 4 between the proximal end 41 and the distal end 42. In the level orientation of the turn-up arm 4, as shown in FIG. 1, the longitudinal direction L of the turn-up arm 4 is parallel or substantially parallel to the axial direction A of the tire building drum 1. In the turned-up orientation of the turn-up arm 4, as shown in FIG. 3, the longitudinal direction L of the turn-up arm 4 is at an oblique angle, preferably an oblique angle of at least thirty degrees, with respect to the axial direction A. The turn-up arm 4 comprises a wheel or a roller 44 that is rotatably supported at the distal end 42 to press the pre-assembly PA and the sidewall SW during the turning-up against the shaped part of the carcass C.

As shown in FIG. 3, each turn-up arm 4 is provided with a sliding surface 45 that faces outwards in the radial direction R. The sliding surface 45 extends in the longitudinal direction L of the turn-up arm 4 over at least the length of the turn-up arm 4 that supports the pre-assembly PA and/or the sidewall SW. Preferably, the sliding surface 45 extends along the entire length or substantially the entire length of the turn-up arm 4 in the longitudinal direction L between the proximal end 41 and the distal end 42. The sliding surface 45 comprises a conical part 46 that extends under a more oblique angle with respect to the axial direction A than the remaining part 47 of the sliding surface 45. The conical part 46 of the sliding surface 45 is nearest to the proximal end 41 with respect to the remaining part 47 of the sliding surface 45. The conical part 46 preferably extends in the longitudinal direction L over at least a third of the length of the arm body 43 of the turn-up arm 4. FIG. 1 shows the plurality of turn-up arms 4 in the level orientation. In this level orientation, the conical parts 46 of the sliding surfaces 45 of all the turn-up arms 4 together form a conical section 13 in the circumferential surface 12 of the tire building drum 1. The remaining parts 47 of the sliding surfaces 45 form a right cylindrical or substantially right cylindrical section 14 of the circumferential surface 12 of the tire building drum 1.

The sliding surface 45 according to the present invention is preferably coated with a non-sticking, non-tacky or low-friction material, for example a plasma coating, Teflon or a combination thereof.

The tire building drum 1 is optionally provided with cover plates 47 extending in the circumferential direction E between each pair of directly adjacent turn-up arms 4 to substantially close gaps or slits between the turn-up arms 4 in the circumferential direction E.

As shown in FIGS. 1-5, the tire building drum according to the invention is provided with a sleeve 6 that is fitted in the circumferential direction E around the turn-up arms 4. In FIGS. 1-4, the sleeve 6 has been partially cut-away schematically, to expose the inside of the sleeve 6 housing the aforementioned turn-up arms 4. Naturally, as follows from the FIG. 5, the sleeve 6 extends fully and/or annularly around the turn-up arms 4 in the circumferential direction E. The sleeve 6 is arranged to cover the slits or gaps that are created and/or present between the turn-up arms 4 in the circumferential direction E, in particular when the turn-up arms 4 move from the level orientation towards the turned-up orientation. The position of the turn-up arms 4 underneath the sleeve 6 is schematically indicated with the dashed lines on the sleeve 6. In particular, the sleeve 6 can be used to create a closed or substantially closed circumferential surface 12 of the tire building drum 1 between the first axial position P1 and the second axial position P2, which circumferential surface 12 is smooth enough to receive uncured, soft rubber without leaving imprints in or damaging said rubber. Because of the presence of the sleeve 6, tire components, such as the sidewall SW, may even be extruded and/or strip winded directly onto the tire building drum 1. Thus, a separate production drum for these tire components is not required.

The sleeve 6 has a first end 61 at or near the first axial position P1 and a second end 62 that is circumferentially fitted around the plurality of the turn-up arms 4 at the sliding surfaces 45 thereof. The first end 61 is fixed or retained in the axial direction A at or near the first axial position P1 and is hereafter referred to as the 'fixed end' 61. The second end 62 is movable and/or slidable over the sliding surfaces 45 of the plurality of turn-up arms 4 in the respective longitudinal directions L of said turn-up arms 4 and is hereafter referred to as the 'movable end' 62. It is noted that in this first example as shown in FIGS. 1-5, the movable end is a free end.

In this exemplary embodiment, the tire building drum 1 is provided with a fixing member 8 for fixedly attaching the fixed end 61 to the drum half. The fixing member 8 is arranged at a side of the bead holder 3 in the axial direction A opposite to the arm drive member 5, and is preferably located as close as possible to or directly adjacent to the bead holder 3 in the axial direction A. Preferably, the fixing member 8 is slidable in the axial direction A over a short distance towards and away from the bead holder 2 to compensate for the expansion of the bead lock mechanism 30 prior to the turning-up of the turn-up arms 4, as shown in FIGS. 1 and 2. The fixing member 8 however remains in a fixed axial position with respect to the first axial position P1 during the turning-up of the turn-up arms 4.

Figure 6:
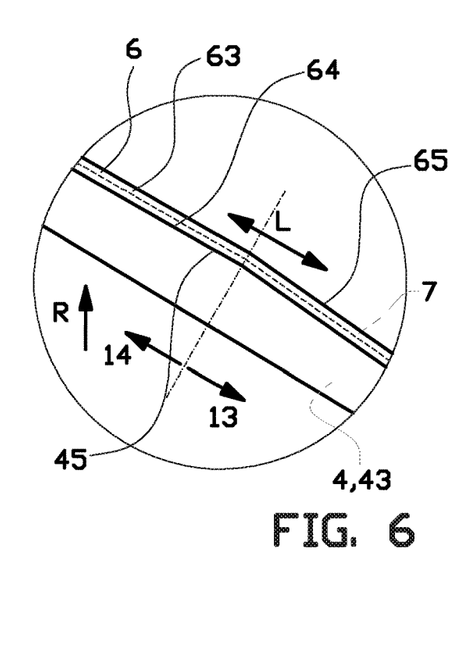
FIG. 6 shows a detail of the tire building drum according to the circle VI in FIG. 3.

As shown in detail in FIG. 6, the sleeve 6 comprises a rubber layer 63 having an internal surface 64 facing inwards in the radial direction R and an external surface 65 facing outwards in the radial direction R. The internal surface 64 is arranged to abut the sliding surfaces 45 of the plurality of turn-up arms 4. The external surface of the sleeve 6 is arranged for receiving and/or supporting the pre-assembly PA and the sidewall SW. The internal surface 64 of the sleeve 6 is preferably coated with a non-sticking, non-tacky or low-friction material, for example a plasma coating, Teflon or a combination thereof. A 'coating' in the context of this invention means a surface treatment or layer that is applied to a surface. The coating at the internal surface 64, optionally in combination with the aforementioned coating on the sliding surfaces 45, facilitates easy sliding of the sleeve 6 over the sliding surfaces 45. Additionally or alternative, the external surface 65 of the sleeve 6 is coated with a non-sticking, non-tacky or low-friction material, for example a plasma coating, Teflon or a combination thereof. This can reduce the friction between the sleeve 6 and the pre-assembly PA and the sidewall SW thereof, during the turning-up.

Alternatively, the internal surface 64 and/or external surface 65 is provided with a fabric layer, preferably a bi-elastic fabric. Such a fabric provides excellent elongation properties in both longitudinal and transversal directions, which allow a very smooth deformation of the sleeve during the turn-up action.

The layer 63 comprises an elastomeric material, preferably rubber. The rubber layer 63 is elastic in at least the circumferential direction E of the tire building drum 1. As such, the sleeve 6 is fitted tightly and elastically around the plurality of turn-up arms 4. Specifically, the radially outwardly facing sliding surface 45 of the turn-up arms 4 are in direct contact or abutment with the internal surface 64 of the sleeve 6. Although the elastomeric material of the rubber layer 63 may be a bi-directional elastomeric material that is elastic in a direction transverse to the circumferential direction E, the elasticity of the rubber layer 63 in said transverse direction is reduced by embedding a plurality of inelastic or substantially inelastic reinforcement elements 7 into the rubber layer 63 in a reinforcement direction transverse or perpendicular to the circumferential direction E.

In this exemplary embodiment of the invention, the reinforcement elements 7 are reinforcement filaments or reinforcement cords, preferably composite fiber reinforcement cords comprising Poly-Ethylene Terephthalate (PET), Aramid and/or Rayon fibers. Alternatively, the reinforcement elements 7 may also be embedded in or formed by the coating or the surface layer on the internal surface 64 and/or the external surface 65 of the rubber layer 63 of the sleeve 6.

The reinforcement direction of the reinforcement elements 7 has at least a directional component parallel to the axial direction A. The reinforcement direction extends in a radial plane of the tire building drum 1 that intersects with and is parallel to the axial direction A. The reinforcement direction extends from the first axial position P1 or the fixed end 61, in a path of the rubber layer 63 over the bead holder 3 and the turn-up arms 4 in the axial direction A, towards the second axial position P2 or the free end 62. As shown in FIG. 1, the reinforcement elements 7 extend parallel to or substantially parallel to the axial direction A of the tire building drum 1 when the turn-up arms 4 are in the level orientation. The reinforcement elements 7 extend at least in the part of the sleeve 6 that rests on the sliding surfaces 45 of the turn-up arms 4, preferably at the position where the sleeve 6 directly supports the pre-assembly PA and the sidewall SW. In the embodiment as shown, the reinforcement elements 7 extends in or through the full length of the sleeve 6 between the fixed end 61 and the free end 62. The reinforcement elements 7 extend parallel to the longitudinal direction L of the turn-up arms 4 at least in the part where the sleeve 6 is supported on the sliding surfaces 45.

The tire building drum 1 is provided with a first biasing member 91 for biasing the turn-up arms 4 from the turned-up orientation, as shown in FIG. 3, towards and/or into the level orientation, as shown in FIG. 1. The tire building drum 1 is further provided with a second biasing member 92 for biasing the free end 62 of the sleeve 6 in the longitudinal directions L of the respective turn-up arms 4 towards the second axial position P2 as shown in FIGS. 3 and 4. In this example, the first biasing member 91 and/or the second biasing member 92 are formed as elastic annular biasing elements 91, 92. The first biasing element 91 and the second biasing element 92 are arranged to be elastically fitted in the circumferential direction E around, at or near the proximal ends 41 of the turn-up arms 4 and the free end of the sleeve 6, respectively. Preferably, the first biasing element 91 and/or the second biasing element 92 are formed as annular springs. As best seen in FIGS. 1-4, the free end 62 of the sleeve 6 is folded back onto itself, thereby forming a rim for circumferentially receiving the second biasing member 92.

Since the sleeve 6 also has elastic properties, the sleeve 6 also provides a biasing force on the turn-up arms 4 to push them back towards the level orientation. In case the biasing force provided by the sleeve 6 onto the turn-up arms 4 is large enough, the first and/or second biasing members 91, 92 can be omitted.

The method for shaping tire components on the aforementioned tire building drum 1 will be elucidated below with reference to FIGS. 1-6.

FIG. 1 shows the situation prior to turning-up in which the turn-up arms 4 of the tire building drum 1 are in a level orientation such that the circumferential surface 12 of the tire building drum 1 is as flat and/or smooth as possible. The free end 62 of the sleeve 6 biased by the second biasing member 92 is arranged in a starting position on the sliding surfaces 45 of the turn-up arms 4 at or near the proximal end 41 of the turn-up arms 4. The carcass C is applied around the tire building drum 1, either by strip-winding, winding, a transfer from a production drum (not shown) or a combination of the aforementioned application techniques. The carcass C comprises the pre-assembly PA with sidewalls SW. The pre-assembly PA extends over the center deck 11 and has a lateral part that extends over the bead holder 3 in the axial direction A towards the second axial position P2. At the turn-up arms 4, the pre-assembly PA extends over and around at least a part of the sleeve 6. The sidewall SW is arranged adjacent to the bead holder 3 in the axial direction A on the opposite side with respect to the fixing member 8.

FIG. 2 shows the situation in which the bead B has been applied around the carcass C at the bead holder 3. The bead locking mechanism 30 has been expanded in the radial direction R to seal the part of the carcass C at the center deck 11 with respect to the lateral part of the carcass C extending on the opposite side of the bead B at the turn-up arms 4. Simultaneously with the radial expansion of the bead locking mechanism 30, the fixing member 8 has been moved slightly in the axial direction A towards the bead holder 2 to compensate for the radial expansion of the sleeve 6 running over the expanded bead locking mechanism 30. The fixing member 8 now remains fixed in the axial position as shown in FIG. 2, at or near the first axial position P1. Subsequently, the carcass C has been inflated at the center deck 11 into a desired torus-like shape of the green tire. The shaped part of the carcass C now extends outwards in the radial direction directly adjacent to the bead B in the axial direction A, at the side of the bead B opposite to the arm drive member 5. A guiding member 32 of the bead locking mechanism 30, which is arranged between the bead 3 and the fixing member 8, pushes the sleeve 6 upwards against at least the lower part of the bead 3 at a side facing the center deck 11. The pre-assembly can now be turned-up around the bead B towards and against the radial side of the shaped part of the carcass C.

FIG. 3 shows the situation in which the arm drive member 5 has been moved in the axial direction A towards the bead holder 3 to cause the turn-up arms 4 to turn-up the lateral part of the pre-assembly PA supported thereon around the bead B at the bead holder 3. Initially, the pressure rollers 44 at the distal ends 42 of the turn-up arms 4 come into abutment with the chamfered sides of the bead holder 3 in the axial direction A and are subsequently forced radially outwards. Subsequently, as the arm drive member 5 is moved further in the axial direction A, the pressure rollers 44 at the distal ends 42 of the turn-up arms 4 turn-up the pre-assembly PA around the bead B. At this point, the sidewall SW, which was on top of the pre-assembly PA is sandwiched between the radial side of the shaped part of the carcass C and the turned-up pre-assembly PA. The pressure rollers 44 roll over the turned-up pre-assembly PA and the sidewall SW to create a strong adherence between the turned-up pre-assembly PA, the sidewall SW and the shaped part of the carcass C.

During the turning-up from the level orientation as shown in FIG. 2 and the turned-up orientation as shown in FIG. 3, the diameter of the turn-up arms 4 at the distal end 42 increases considerably with respect to the proximal end 41. Consequently, the sleeve 6 is elastically stretched or expanded considerably in the circumferential direction E to an increasingly larger diameter from the proximal end 41 towards the distal end 42. As the fixed end 61 of the sleeve 6 is retained in the axial direction A at or near the first axial position P1, the mechanical expansion of the turn-up arms 4 causes the free end 62 to passively or freely move in the respective longitudinal directions L of the turn-up arms 4 over the sliding surfaces 45. The optional coatings or surface layers on either the internal side 64 of the rubber layer 63 of the sleeve 6, the sliding surfaces 45 of the turn-up arms 4 or both may improve the ability of the free end 62 of the sleeve 6 to move freely over the sliding surfaces 45 of the turn-up arms 4.

FIG. 4 shows the situation in which the turning-up has been completed and the arm drive member 5 is made to move in the axial direction A away from the bead holder 3 to cause or allow the turn-up arms 4 to return to the level orientation as shown in FIG. 1. The first biasing element 91 at the proximal end 41 of the turn-up arms 4 biases said turn-up arms 4 to move radially inwards. The sleeve 6 elastically follows the turn-up arms 4 and consequently contracts to a smaller diameter around the reclining turn-up arms 4. As a result of the elastic tension in the sleeve 6 in the circumferential direction E, the free end 62 of the sleeve 6 will tend to move in the respective longitudinal directions of the turn-up arms 4 over the turn-up arms 4 towards the second axial position P2 automatically, without actively pulling the free end 62. In addition, the second biasing element 92 around the free end 62 of the sleeve 6 aids the return of the free end 62 towards the second axial position P2 by providing an additional elastic tension force in the circumferential direction E, which is converted into a biasing force F acting in the respective longitudinal directions L of the turn-up arms 4, as shown schematically in FIG. 5.

The return of the free end 62 towards the second axial position P2 is further aided when the free end 62 reaches the conical section 13 formed by the conical parts 46 of the sliding surfaces 45 of the respective turn-up arms 4. The transition between the substantially cylindrical section 14 and the conical section 13 is schematically indicated in FIG. 6. Due to the increased conicity of the circumferential surface 12 of the tire building drum 1 at said conical section 13, the free end 62 of the sleeve 6 can slide more easily over the sliding surfaces 45 of the turn-up arms 4, even when the turn-up arms 4 are almost in the level orientation as shown in FIG. 1. The elasticity of the sleeve 6, the biasing element 92, the conical section 13 and the anti-friction coatings or surface layers, all contribute to the return of the free end 62 in the start position as shown in FIG. 1.

Figure 7:
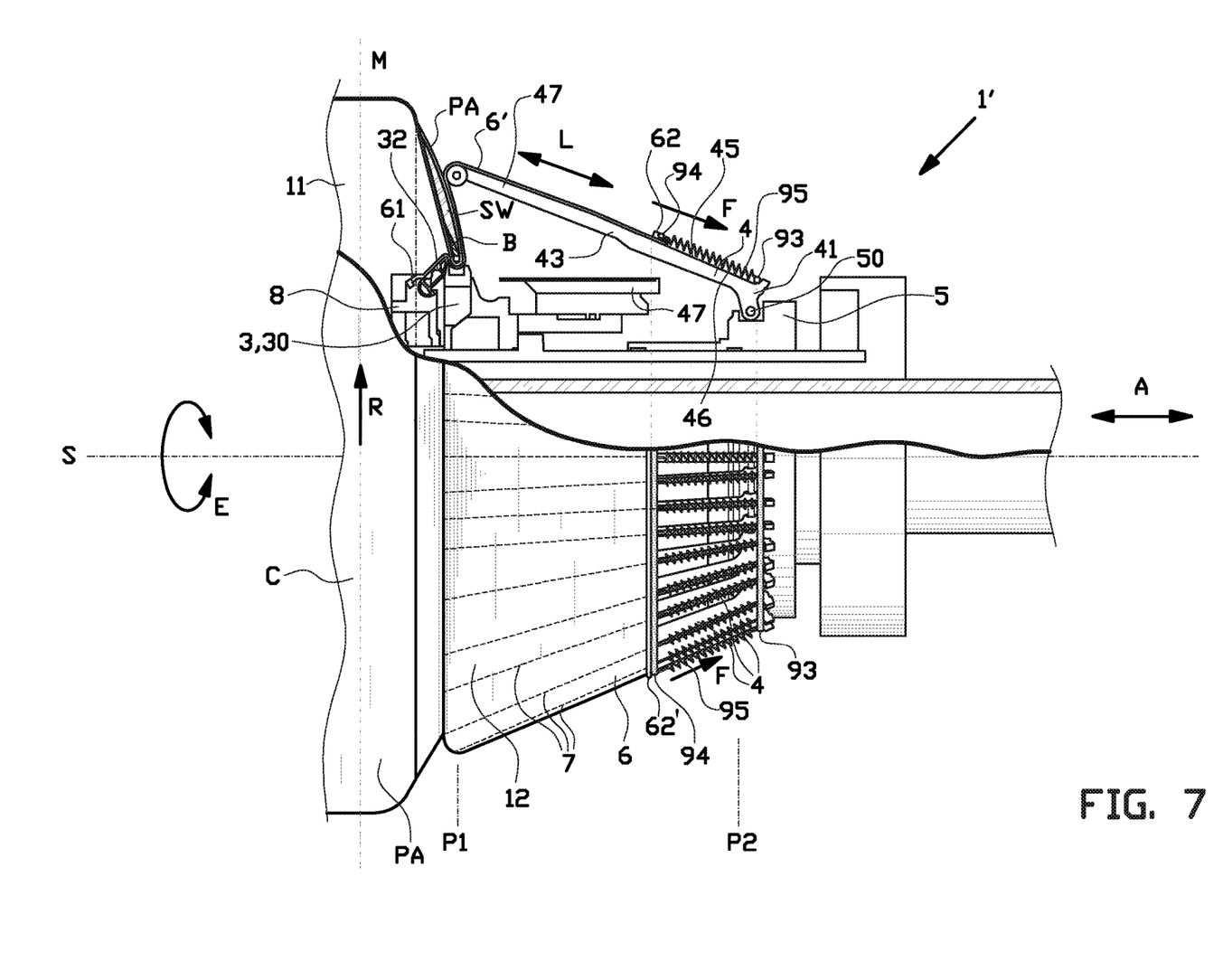
FIG. 7 shows a side view of a second example of a tire building drum according to the invention, during the return of the turn-up arms from the turned-up orientation towards the level orientation.

However, in case the combined action of elasticity of the sleeve 6, the biasing element 92, the conical section 13 and the anti-friction coatings or surface layers, is not sufficient to ensure a proper returning of the free end 62 to the start position, also in the long term, additional biasing elements can be provided to pull the movable end 62' towards the start position, as schematically shown in the second example in FIG. 7.

According to this second example, the movable end 62' of the sleeve 6' is slidably movable in the respective longitudinal directions L of the turn-up arms 4 over the turn-up arms 4, and wherein the tire building drum 1' is provided with biasing elements 95 for biasing the movable end 62' of the sleeve 6' to move in the respective longitudinal directions L of the turn-up arms 4 over the turn-up arms 4 towards the second axial position P2. According to the example, the biasing elements 95 comprises a series of springs, each of which is on a first side attached to a first circumferential attachment member 94 which is attached to the movable end 62'. On a second side facing away from the first side, each one of said springs is attached to a second circumferential attachment member 93 which is attached to the turn-up arms 4 at or near the proximal end 41 thereof. Alternatively, the biasing elements 95 can also comprise other elastic biasing elements, such as an elastic rubber band. The biasing elements 95 are arranged to pull back the movable end 62' towards the second position P2 when the turn-up arms contract toward the drum 1' after the turning-up of the turn-up arms 4.

In the example shown in FIG. 7, the series of springs is arranged to associate one spring with each one of the turn-up arms, and in particular the springs are arranged on top of the turn-up arms. In this case, each one of the springs can be individually attached to the proximal end 41 of the corresponding turn-up arm 4 and the circumferential attachment member 93 can be omitted.

Alternatively, the use of the circumferential attachment member 93 allows to position the biasing elements 95 substantially independent from the turn-up arms 4 or in between the turn-up arms 4. Arranging the biasing elements 95 in between the turn-up arms 4 has the advantage that the biasing elements 95 can be arranged at least substantially below the circumferential surface 12 of the tire building drum 1 to provide a circumferential surface 12 which is as flat and/or smooth as possible.

Figure 8:
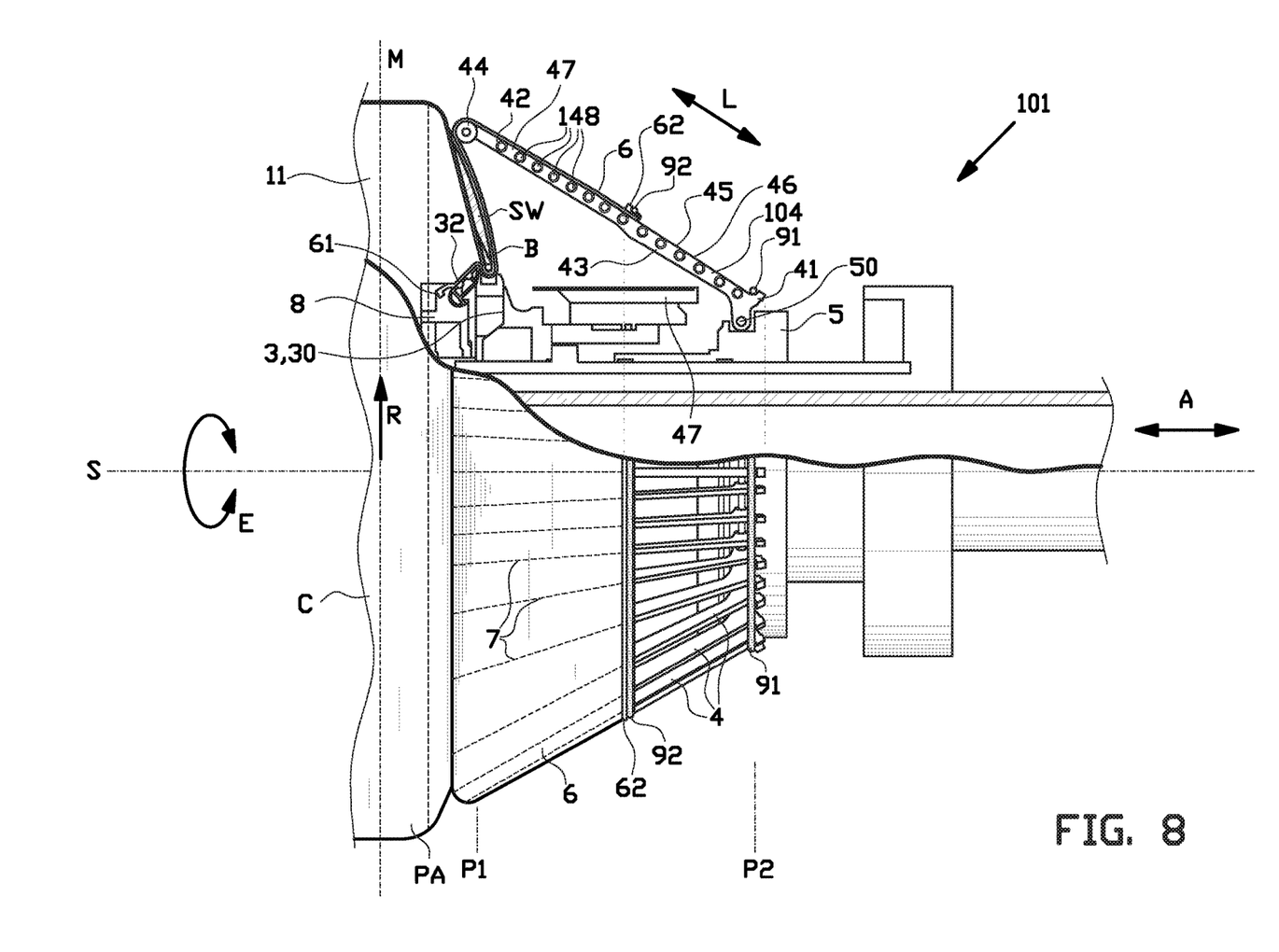
FIG. 8 shows a side view of an alternative tire building drum with alternative turn-up arms that have been provided with rollers.

FIG. 8 shows an alternative tire building drum 101 comprising alternative turn-up arms 104 that have been provided with a plurality of rollers 148 distributed along the length of the turn-up arms 104 in their respective longitudinal directions L. The rollers 148 are arranged to contact and facilitate the sliding of the sleeve 6, and in particular the return of the free end, over the turn-up arms 104 over the turn-up arms 104. The rollers 148 thus provide an alternative to the aforementioned use of coatings and the like.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

In summary, the invention relates to a tire building drum 1 and a method for shaping tire components on said tire building drum 1, wherein the tire building drum 1 comprises an annular sleeve 6 that extends over turn-up arms 4 in the respective longitudinal directions L of the turn-up arms 4, wherein the sleeve 6 is elastic in the circumferential direction E and fits elastically around the turn-up arms 4, wherein the sleeve 6 is provided with inelastic reinforcement elements 7 extending in at least a part of the sleeve 6 in a reinforcement direction transverse to the circumferential direction E of the tire building drum 1, wherein the sleeve 6 is provided with a fixed end 61 that is retained in the axial direction A and a movable end 62 that is movable over the turn-up arms 4 in their respective longitudinal directions L.

The invention claimed is:

1. A tire building drum comprising a rotational axis that defines an axial direction of the tire building drum, wherein the tire building drum further comprises a bead holder extending in a circumferential direction around the rotational axis at a first axial position for holding a bead at said first axial position and an axially movable arm drive member extending circumferentially around the rotational axis at a second axial position spaced apart from the first axial position, wherein the tire building drum is provided with turn-up arms which are distributed circumferentially about the rotational axis and which together form a circumferential surface for supporting tire components between the first axial position and the second axial position, wherein each one of the turn-up arms extends in a longitudinal direction from the arm drive member towards the bead holder and is hingably coupled to the arm drive member about a respective turn-up axis for turning up the tire components supported thereon around the bead at the bead holder as the arm drive member moves towards the bead holder, wherein the tire building drum comprises an annular sleeve that extends over the turn-up arms in their respective longitudinal directions to receive the tire components, wherein the sleeve is elastic in the circumferential direction and fits elastically around the turn-up arms, wherein the sleeve is provided with inelastic reinforcement elements extending in a reinforcement direction parallel to the longitudinal direction of the turn-up arms at least in the part where the sleeve is supported on the turn-up arm, wherein the sleeve is provided with a fixed end that is retained in the axial direction at or near the first axial position and a movable end that is movable over the turn-up arms in their respective longitudinal directions, wherein the movable end of the sleeve is a free end, that is not connected in the longitudinal direction to the turn-up arms with any connection that restrains the movement of the free end in said longitudinal direction, wherein the free end, is arranged to freely move in the longitudinal direction over the turn-up arms in response to contraction or expansion of the turn-up arms.

2. The tire building drum according to claim 1, wherein the movable end of the sleeve is slidably movable in the respective longitudinal directions of the turn-up arms over the turn-up arms.

3. The tire building drum according to claim 1, wherein the sleeve comprises an elastomeric material or rubber.

4. The tire building drum according to claim 3, wherein the sleeve comprises a rubber layer having an internal surface that faces radially inwards and an external surface that faces radially outwards, wherein the sleeve comprises one or more coatings or surface layers that are applied to the internal surface, the external surface or both.

5. The tire building drum according to claim 4, wherein reinforcement elements are embedded in the rubber layer.

6. The tire building drum according to claim 4, wherein reinforcement elements are embedded in or formed by the one or more coatings or surface layers.

7. The tire building drum according to claim 4, wherein the one or more coatings or surface layers comprises a low-friction material on the internal surface of the rubber layer.

8. The tire building drum according to claim 4, wherein the one or more coatings or surface layers comprises a low-friction material on the external surface of the rubber layer.

9. The tire building drum according to claim 1, wherein each of the turn-up arms is provided with a sliding surface that faces radially outwards and that abuts the sleeve, wherein the sliding surface is coated with a low-friction material.

10. The tire building drum according to claim 7, wherein the low-friction material comprises a plasma coating, a polytetrafluoroethylene or a combination thereof.

11. The tire building drum according to claim 1, wherein each of the turn-up arms is provided with a plurality of rollers distributed along the longitudinal direction of said arm and arranged for contacting and facilitating the movement of said sleeve over the turn-up arms.

12. The tire building drum according to claim 1, wherein the reinforcement elements extend in planes intersecting with and parallel to the axial direction.

13. The tire building drum according to claim 1, wherein the reinforcement elements extend in the path of the sleeve between the fixed end and the movable end, at least in the part of the sleeve that is arranged to receive the tire components.

14. The tire building drum according to claim 1, wherein the reinforcement elements extend in the full length of the sleeve between the fixed end and the movable end.

15. The tire building drum according to claim 1, wherein the reinforcement direction has at least a directional component parallel to the axial direction.

16. The tire building drum according to claim 1, wherein the reinforcement elements are reinforcement cords or composite fiber reinforcement cords comprising Polyethylene terephthalate (PET), Aramid and/or Rayon fibers.

17. The tire building drum according to claim 1, wherein each turn-up arm comprises a proximal end that is hingably coupled to the arm drive member, a distal end that faces the bead holder and an elongate arm body extending between the proximal end and the distal end, wherein the arm body is provided with a sliding surface that faces radially outwards and that abuts the sleeve, wherein the sliding surface comprises a conical part that extends under a more oblique angle with respect to the axial direction than the rest of the sliding surface.

18. The tire building drum according to claim 17, wherein the conical part of the sliding surface is nearest to the proximal end with respect to the rest of the sliding surface.

19. The tire building drum according to claim 1, wherein the sleeve extends in the axial direction to the opposite side of the bead holder with respect to the arm drive member, wherein the tire building drum is provided with a fixing member that is coupled to the fixed end of the sleeve to retain said fixed end in the axial direction.

20. The tire building drum according to claim 1, wherein the bead holder comprises a bead lock mechanism that is expandable in the radial direction for clamping the bead in a radially outward direction, wherein part of the sleeve near the fixed end of the sleeve extends in the axial direction over the bead lock mechanism and, in use, is arranged to be retained in the axial direction between the bead and said bead lock mechanism.

21. The tire building drum according to claim 20, wherein the bead lock mechanism comprises a guiding member which is arranged between the bead lock and the fixed end of the sleeve, which guiding member is arranged to push the sleeve upwards against at least the lower part of a bead arranged on said bead lock, at a side of said bead facing the fixed end of the sleeve.

22. The tire building drum according to claim 1, wherein the turn-up arms are hingable with respect to their respective hinge axes between a level orientation in which the turn-up arms extend parallel to the axial direction and a turned-up orientation in which the turn-up arms extend under an oblique angle with respect to the axial direction from the first radius at the arm drive member towards a second, larger radius radially outside the bead holder, wherein the reinforcement elements extend parallel to the axial direction in the level orientation of the arms.

23. The tire building drum according to claim 22, wherein the reinforcement elements extend mutually parallel in the level orientation of the arms.

24. A method for shaping tire components on a tire building drum as claimed in claim 1, wherein the tire building drum comprising a rotational axis that defines an axial direction of the tire building drum, wherein the tire building drum further comprises a bead holder extending in a circumferential direction around the rotational axis at a first axial position for holding a bead at said first axial position and an axially movable arm drive member extending circumferentially around the rotational axis at a second axial position spaced apart from the first axial position, wherein the tire building drum is provided with turn-up arms which are distributed circumferentially about the rotational axis and which together form a circumferential surface for supporting tire components between the first axial position and the second axial position, wherein each one of the turn-up arms extends in a longitudinal direction from the arm drive member towards the bead holder and is hingably coupled to the arm drive member about a respective turn-up axis for turning up the tire components supported thereon around the bead at the bead holder as the arm drive member moves towards the bead holder, wherein the tire building drum comprises an annular sleeve that extends over the turn-up arms in their respective longitudinal directions, wherein the sleeve is elastic in the circumferential direction and fits elastically around the turn-up arms, wherein the sleeve is provided with inelastic reinforcement elements extending in a reinforcement direction parallel to the longitudinal direction of the turn-up arms at least in the part where the sleeve is supported on the turn-up arm, wherein the sleeve is provided with a fixed end that is retained in the axial direction at or near the first axial position and a movable end that is movable over the turn-up arms in their respective longitudinal directions, wherein the method comprises the steps of:
applying a carcass around the tire building drum, wherein a lateral part of the carcass extends over the bead holder in the axial direction and around the sleeve from the first axial position towards the second axial position;
applying a bead around the carcass at the bead holder;
moving the arm drive member in the axial direction towards the bead holder to cause the turn-up arms to turn-up the lateral part of the carcass supported thereon around the bead at the bead holder; and
retaining the fixed end in the axial direction at or near the first axial position while allowing the movable end to move in the respective longitudinal directions of the turn-up arms over the turn-up arms towards the first axial position, wherein the movement of the sleeve in the respective longitudinal directions of the turn-up arms over the turn-up arms is a free movement over the turn-arms in response to contraction or expansion of the turn-up arms.

25. The method according to claim 24, wherein the method further comprises the steps of:
moving the arm drive member in the axial direction away from the bead holder to cause the turn-up arms to return to a level orientation; and
retaining the fixed end in the axial direction at or near the first axial position while allowing the movable end to move in the respective longitudinal directions of the turn-up arms over the turn-up arms towards the second axial position.

26. The method according to claim 25, wherein the sleeve is biased to move towards the second axial position, wherein the step of allowing the movable end to move the respective longitudinal directions of the turn-up arms over the turn-up arms towards the second axial position occurs automatically with the return of the turn-up arms to their level orientation.

27. The method according to claim 26, wherein the bias is generated by the elasticity of the sleeve in the circumferential direction.

28. The method according to claim 24, wherein the movement of the sleeve over the turn-up arms in the respective longitudinal directions of the turn-up arms is a sliding movement.

\* \* \* \* \*